United States Patent [19]
Horton et al.

[11] 3,860,269
[45] Jan. 14, 1975

[54] COAXIAL TUBE COUPLER ASSEMBLY

[76] Inventors: Lawrence R. Horton, 4451 Totana Dr., Tarzana, Calif. 91356; Charles A. Jackson, 1458 Norwich Ave., Thousand Oaks, Calif. 91360; William P. Holcomb, 31803 Tyneborne Ct., Westlake Village, Calif. 91360; Catherine Horton, 4451 Totana Dr., Tarzana, Calif. 91356

[22] Filed: Aug. 22, 1973

[21] Appl. No.: 390,436

[52] U.S. Cl. ............... 285/47, 285/132, 285/133 R, 285/157, 285/423
[51] Int. Cl. ............................................ F16l 11/12
[58] Field of Search ............ 285/124, 132, 157, 47, 285/133 R, 138, 423

[56] References Cited
UNITED STATES PATENTS

| | | | |
|---|---|---|---|
| 912,671 | 2/1909 | Griesser | 285/133 R X |
| 1,638,571 | 8/1927 | Gotes | 285/133 R |
| 2,274,233 | 2/1942 | Dewald | 285/124 X |
| 3,747,961 | 7/1973 | Couch | 285/47 |

Primary Examiner—Dave W. Arola
Attorney, Agent, or Firm—John J. Posta, Jr.

[57] ABSTRACT

The improved coaxial tube coupler assembly of the invention comprises two pairs of coaxial tubes held in spaced relation from one another within a tube coupler. The open ends of the outer tubes of the pairs of tubes terminate within the coupler in communication with an internal passageway so that fluid can be circulated between the two outer tubes. The two inner tubes extend beyond the coupler and are interconnected for fluid circulation therebetween. The interconnection is effected by a separate tube and a pair of elbows. Removable plugs seal the coupler body from the inner tubes extending therefrom. The assembly is light weight, inexpensive and highly effective.

1 Claim, 1 Drawing Figure

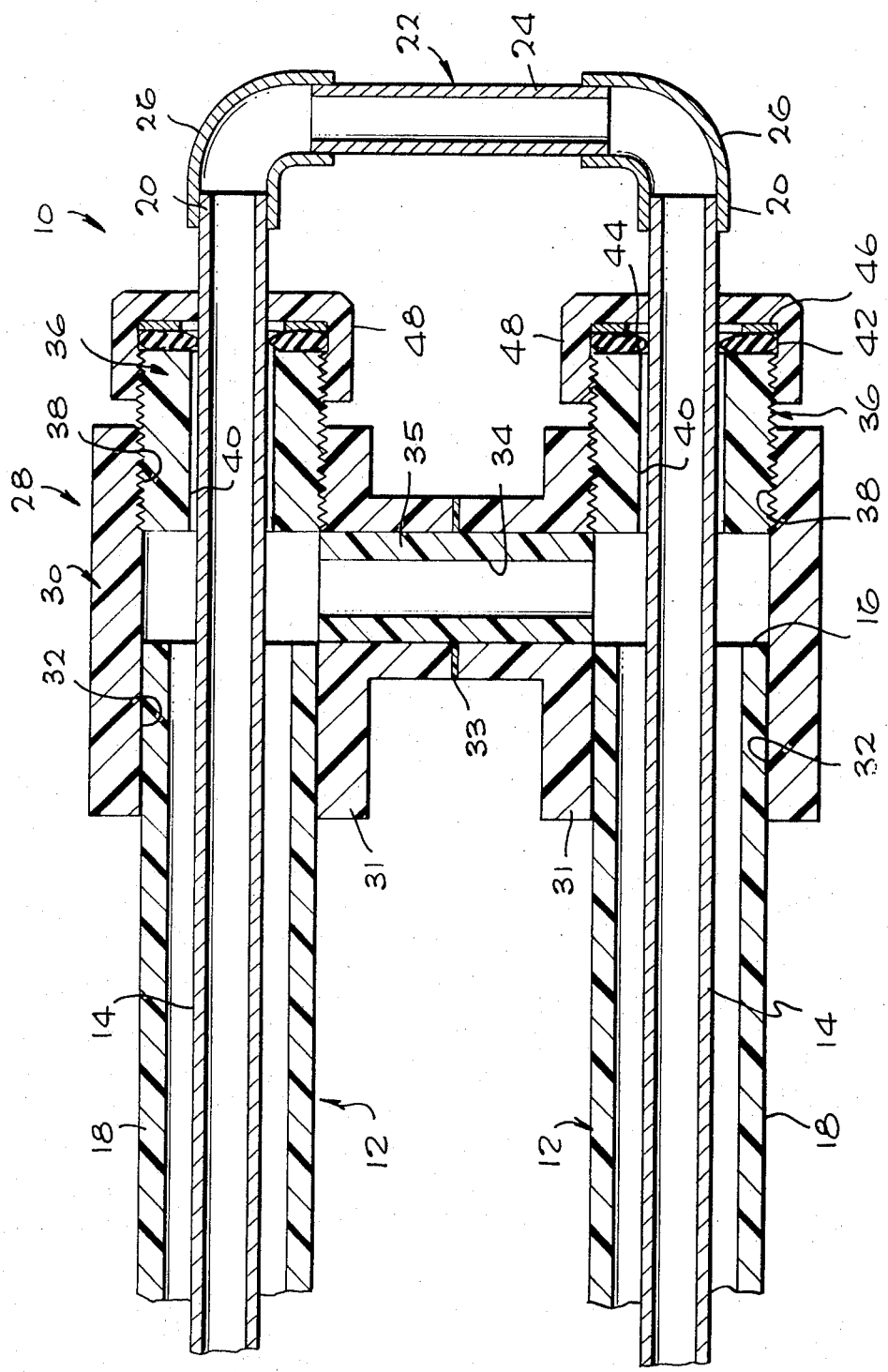

've3,860,269

COAXIAL TUBE COUPLER ASSEMBLY

BACKGROUND OF THE INVENTION

1. Field of the Invention

The present invention generally relates to tubes and more particularly to an improved coaxial tube assembly for heat exchangers and the like.

2. Description of the Prior Art

Various types of tube coupling means are known in the art. Most employ removable fittings and accessories which may be expensive and are not well adapted for such applications as heat exchanger systems and the like, particularly those utilizing coaxial tubes.

When it is desired to provide a coaxial tube system for a heat exchanger or the like, there is a special problem of supporting the inner tube within the outertube. There is also the more serious problem of assembling the two tubes, one within the other, when the tube path is convoluted, for example, when it is desired to form a closed loop return line fluid flow pattern for both coolant and fluid to be cooled. The outer tube must then be made in segments which have to be fitted together to enclose the inner tube throughout its complicated flow path. Such a procedure is expensive and time-consuming, and the overall cost of such a system is generally high.

Accordingly, it would be desirable to provide an improved, inexpensive durable coaxial tube coupler assembly for convoluted flow path applications and special tube configurations such as are usually encountered in heat exchangers and the like.

SUMMARY OF THE INVENTION

The foregoing need has now been satisfied by the improved coaxial tube coupler assembly of the present invention. The assembly is substantially as set forth in the Abstract above.

In this regard, the assembly incorporates two pairs of heat exchange tubes or the like, the inner tube of each pair being physically joined to its counterpart inner tube to form a fluid flow loop therewith. The outer tube of each pair has its open end disposed and supported in the coupler, which coupler provides a passageway for fluid to flow between the outer tubes, again to establish a fluid flow pattern, but without the outer tubes being physically joined. Thus, the need for special outer tube sections or segments of complicated shape covering the inner tubes throughout their flow loop is obviated.

The coupler and attendant parts also serve to support the inner tubes in proper relation to the outer tubes and the tube pairs in proper relation to each other. The assembly effects substantial savings in fabrication, assembly and maintenance costs in coaxial tube applications, such as in heat exchangers. Various other features of the invention are set forth in the following detailed description and accompanying drawing.

BRIEF DESCRIPTION OF THE DRAWING

The single FIGURE schematically depicts in cross-section a preferred embodiment of the coaxial tube coupler assembly of the present invention.

DESCRIPTION OF THE PREFERRED EMBODIMENT

As shown schematically in cross-section in the single FIGURE of the drawings, an improved coaxial tube coupler assembly 10 is provided, which assembly 10 includes two pairs 12 of coaxial tubes, the inner tube 14 of each pair 12 extending beyond the open end 16 of the outer tube 18 of that pair. One end 20 of each of the inner tubes 14 is interconnected with the corresponding end 20 of the other inner tube 14. The interconnection is accomplished by a connecting means 22 in the form of a tube 24 and a pair of elbows 26 secured to tube 24 and ends 20 as by welding, soldering or the like, depending on the composition of tubes 14 and 24. Connecting means 22 places tubes 14 in fluid communication with each other so as to provide a closed loop (return line) fluid flow pattern.

Connecting means 22 and ends 20 usually are positioned outside of a coupler 28, as shown in the drawing, which coupler encloses the open end 16 of each outer tube 18. In this regard, coupler 28 comprises a housing 30 which may be of any suitable configuration, such as the I-shaped configuration shown in the drawing and can be of unitary or multiple piece construction. Thus, housing 30 may comprise, for example, two identical subhousings 31 joined together by plastic cement or the like along a joint-line 33 and further held together by a joinder tube 35 disposed as shown in the single FIGURE, between and within both sub-housings 31.

A pair of spaced aligned passageways 32 extend from end to end through coupler 28. In the single FIGURE, passageways 32 are parallel to each other. However, another orientation can be employed if desired. Passageways 32 are dimensioned to snugly receive, in fluid sealing engagement therewith, the ends 16 of the outer tubes 18 and a portion of the length thereof, as shown in the single FIGURE.

It will be noted that coupler 28 also includes a transverse internal passageway 34 extending into communication with both of the aligned passageways 32. Joinder tube 35 is disposed in passageway 34 as shown in the single FIGURE. Tube 35 helps make coupler 28 fluid-tight across the joint-line 33. Normally, open outer tube ends 16 are positioned such that they are near to or define one margin of passageway 34. Fluid sealing means in the form of a pair of plugs 36 or the like are disposed in passageways 32 and spaced from and opposite the ends 16 of tubes 18 so as to form another margin of passageway 34, as shown in the single FIGURE. Plugs 36 can be, for example, externally threaded. The portion 38 of coupler 28 shown in the drawing can also be internally threaded along the passageways 32 to facilitate installation and removal of plugs 36.

Plugs 36 are adapted to seal off passageways 32 so as to prevent the flow of fluid from them and out of coupler 28. Plugs 36 also contain apertures 40 therethrough which apertures are dimensioned to snugly support inner tubes 14 as they extend out of coupler 28 for interconnection via tube 24 and elbows 26. Seals are used to prevent leakage of fluid from coupler 28 through apertures 40. For this purpose, an o-ring 42 is secured around each tube 14 adajcent the outer edge 44 of each plug 36 and is held in place by a compression washer 46 disposed around each tube 14, in turn releasably urged into place by an internally threaded cap 48 threadably secured on each plug 36, as shown in the single FIGURE. When caps 48 are screwed tightly on plugs 36, o-rings 42 effectively seal off any spaces between outer surfaces 44 of plugs 36 and the adjacent surfaces of tubes 14.

Tubes 14 can be fabricated of any suitable material such as thermally conductive metal, for example, aluminum, copper, steel, tin, or the like. Tubes 18 can also be fabricated of any suitable material such as thermally insulative material, for example, plastic such as polyethylene, polystyrene, polycarbonate or the like, moldable as castable resin, or ceramic, such as clay, alumina, or the like, resin impregnated fiberglass, wood, cellulosic composite material, or metal covered with a thermally insulative jacket of, for example, fiberglass, cellulosic material or the like.

The housing 30 of coupler 28, as well as joinder tube 35, can be fabricated of any suitable material such as metal, wood, ceramic, plastic, composite material or the like. However, for heat exchange applications, it is preferred that the housing 30 be fabricated of thermally insulative material. A particularly suitable material comprises plastic which can be molded in, for example, the form of sub-housings 31, to which plugs 36 of plastic, wood, cork, rubber or the like can be attached. Sub-housings 31 can be joined together at joint-line 33, as by heat fusion, plastic cement, glue, etc. The o-rings 42 usually are of natural or synthetic rubber, and the washers 46 usually are of hard plastic, metal or the like. The caps 48 can be of the same material as or different from the housing 30 and/or plugs 36. Thus, they can be of rubber, metal, wood, plastic or composite material or the like.

The interconnecting means in the form of tube 24 and elbows 26 can be of any suitable material such as plastic, with elbows glued, fused, threaded or swaged in place, or metal, such as copper, aluminum, steel, tin or the like, with the elbows 26 welded, soldered, fused, bronzed, threaded, glued or otherwise secured in place.

Assembly 10 can be assembled by inserting the two pairs 12 of coaxial tubes into the passageways 32 of coupler 28 until the open ends 16 of the outer tubes 18 terminate therein adjacent to and in communication with the transverse passageway 34 in coupler 28. The ends 20 of inner tubes 14 project out of the opposite end of passageways 32. Plugs 36 are then secured in coupler 28 over ends 20, after which o-rings 42, washers 46 and caps 48 are positioned against the outer end of plugs 36. Elbows 26 are then secured to ends 20 of tubes 14 and to tube 24 to complete the assembly.

In the event that tubes 14 are already interconnected via elbows 26 and tube 24, or in the event that tubes 14 comprise an integral part of a single tube, i.e., parallel arms of a u-shaped tube or the like (not shown), and the remaining components of assembly 10 are not assembled, they can be put in place by sliding caps 48, washers 46, o-rings 42 and plugs 36 on ends 20 in that order, then moving housing 30 into place over ends 16 of tubes 18 to achieve the desired results.

Assembly 10 has the advantage of being relatively simple. Moreover, it can be made inexpensively, inasmuch as coupler 28 can be molded at a high rate in two parts, or the like, of low cost thermoplastic or thermosetting material. Caps 48, washers 46 and o-rings 42 also can be made inexpensively. Assembling of these components on the tube pairs 12 is rapid and easy. So also is the formation of the interconnection 22.

The assembly 10 holds the coaxial pairs 12 of tubes firmly in place while permitting the shunting of the heat exchange medium, for example, coolant or the fluid to be cooled between tubes 18. Assembly 10 also provides for the continuous flow of the other fluid (heat exchange medium or cooled fluid) through tubes 14 and 24 in a closed loop mode. It will be understood that the heat exchange medium can be either a coolant or heating agent in liquid or gaseous form and can be disposed either in tubes 14 or tubes 18. The second fluid, either liquid or gas, occupies the other pair of tubes and has heat added or removed therefrom via the heat exchange medium.

It will be further understood that the described assembly 19 can be used in the interconnecting of pairs of coaxial tubes for purposes other than or in addition to heat exchange applications such as are described above. It will also be understood that assembly 10 functions equally well for such other applications.

Various modifications, changes, alterations and additions can be made in the present assembly and in its components and their parameters. All such modifications, changes, alterations and additions as are within the scope of the appended claims form part of the present invention.

We claim:

1. An improved coaxial tube coupler assembly comprising, in combination:
   a. a first and second spaced pair of coaxially aligned tubes, one end of the inner tube of each said pair extending beyond the adjacent end of the outer tube of each said pair, said adjacent end being open;
   b. means interconnecting said one ends of said inner tubes for fluid transfer therebetween;
   c. a coupler sealingly disposed around said open ends of said outer tubes and maintaining said outer tubes in said spaced relation, said coupler defining an internal passageway between said open ends for fluid transfer therebetween;
   d. wherein said inner tubes extend through said coupler and are supported in relation thereto and wherein said interconnecting means is disposed outside of said coupler;
   e. wherein support means are releasably secured to said coupler and wherein said inner tubes extend therethrough and are supported thereby;
   f. wherein said coupler defines a pair of spaced aligned passageways extending therethrough; within which aligned passageways said open ends of said outer tubes are disposed and supported, said internal passageway extending into communication with said aligned passageways, said open ends of said outer tubes terminating in said aligned passageways at about said internal passageway;
   g. wherein plug means are releasably disposed in said aligned passageways to seal the same and define with said outer tubes a portion of said internal passageway;
   h. wherein said plug means comprise support means which define apertures therethrough with which portions of said inner tubes are sealingly disposed and supported;
   i. wherein said inner tubes are heat exchange tubes, wherein said interconnecting means are disposed outside of said coupler, and wherein said tube pairs are parallel with each other;
   j. wherein said inner tubes are heat exchange tubes, wherein said outer tubes are thermally insulative tubes and wherein said coupler and plug means are also thermally insulative;

k. wherein said inner tubes comprise metal and wherein said outer tubes, coupler and plug means comprise plastic;

wherein said plug comprises a threaded plastic reducing nipple, wherein said metal comprises copper and wherein said interconnecting means comprises a length of tube secured to said inner tube ends via tube elbows.

* * * * *